3,322,704
POLYOLEFIN-METAL SALT-LUBRICANT COMPOSITIONS HAVING IMPROVED DYE RECEPTIVITY
Richard S. Berger and Carl W. Schroeder, Orinda, Calif., assignors to Shell Oil Company, New York, N.Y., a corporation of Delaware
No Drawing. Filed Dec. 16, 1963, Ser. No. 330,647
13 Claims. (Cl. 260—23)

This invention relates to improvements in the preparation of dyed polyolefin compositions. More particularly it relates to an improved method of incorporating metal-organic salts into polypropylene, resulting in improved compositions suitable for the production of dyed textiles.

Crystalline polypropylene has recently achieved substantial commercial importance. One of the uses for which it is particularly adapted is the production of textile fibers of outstanding properties. One of the main drawbacks to wide commercial use of polypropylene fibers is the difficulty of dyeing polypropylene compositions with available commercial dyes. The dyeing problem has been attacked in several ways, including chemical modifications of the polymer, incorporation of various organic compounds having dyeable sites, incorporation of metals or compounds of metals, and use of special dyes.

This invention is directed to the method in which dyeable textiles are provided by incorporating into the polymer salts of various metals which are capable of combining with dyes such as those known as mordant dyes. In this method of producing dyeable polymer it is particularly advantageous to employ very low concentrations of the metal compound in order to prevent adverse effects of the metal compound on the polymer. It has been found that when metal organic compounds are incorporated in polypropylene in the low concentrations which are desired to prevent adverse effects on the polymer, the distribution of the metal organic compound is sometimes irregular and the resulting composition, when converted into textile fibers, consequently exhibits reduced dye affinity (dyeability).

This invention provides a simple, improved method for producing dyed compositions of polypropylene and similar polymers in which dyeability is imparted by incorporation of metal salts of carboxylic acids. In essence, the invention comprises the steps of (1) combining polymer, in finely divided or particulate form, with a suitable metal salt of a carboxylic acid and with a third ingredient, typically a paraffin wax, hydrocarbon oil, or dialkyl ether of polyalkylene oxide, (2) intimately mixing the three ingredients under conditions at which the polymer is in melted form, (3) converting the resulting mixture into textile fibers, films or fine particles which exhibit outstanding dye affinity when compared with product similarly prepared but without said third ingredient, and (4) dyeing said fibers, films or particles by bringing them into reactive surface contact with an aqueous dispersion of a finely divided, water-insoluble dyestuff capable of combining with the metal. The resulting dyed fibers are characterized by stability to washing, dry cleaning and fading.

INGREDIENTS OF THE DYEABLE COMPOSITIONS

*Polymers.*—Suitable polymers for use in this invention are resins consisting predominantly of crystallizable stereoregular, and particularly of isotactic, polypropylene. Following conventional terminology, reference to "crystallizable" or "stereoregular" polypropylene means, unless the context indicates otherwise, solid polypropylene having a high degree of stereoregularity, reflected in at least 50% crystallinity, usually between 60 and 70% (as determined by X-ray diffraction analysis, infrared analysis or comparable methods), when solidified under conditions which favor crystallization. In general this type of polypropylene contains at most only a very small proportion which is extractable in paraffinic hydrocarbons of up to gasoline boiling range. Typically, the proportion of highly crystallizable polypropylene which is extractable in boiling heptane or isooctane is less than 10% and usually less than 5%. The viscosity average molecular weight of such stereoregular polypropylene is usually at least about 40,000 and generally between 100,000 and 1,600,000. The intrinsic viscosity, measured in Decalin at 150° C., expressed in dl/g., may be as low as 0.8 or less and as high as 7 or more. Crystallizable polypropylenes employed for melt spinning of textile fibers generally have an intrinsic viscosity between 1.3 and 4.5 and preferably between 1.5 and 3. As is known, intrinsic viscosity of polypropylene is generally reduced by degradation during melt spinning.

Dyeable compositions can be prepared according to this invention also from crystalline linear polymers of other alpha-monoolefins, particularly those in the range having from 2 to 8 carbon atoms, such as ethylene, 1-butene, 3-methyl-1-butene, 4-methyl-1-pentene, 4-methyl-1-hexene and the like, which are known to produce crystalline polymers.

All of these polymers are produced by so-called low-pressure polymerization methods. Reactants, catalysts, and conditions useful in the production of such polyolefins are known. The state of the art in this field in 1959 is reviewed, for example, in "Linear and Stereoregular Addition Polymers," By Gaylord and Mark, Interscience Publishers, Inc., New York, 1959. Polyethylene and polypropylene resins are now staple materials of commerce and polymers of other olefins can be similarly prepared.

Non-rubbery copolymers of the above-mentioned olefins, such as block copolymers, may also be employed in this invention.

*Metal compounds.*—The metal compounds employed in dyeable polymer fibers according to this invention are preferably the salts of organic acids of high molecular weight, of which naphthenic acids, and aliphatic fatty acids of 18 carbon atoms are exemplary.

All of the useful metals have a valence of at least 2. They are selected from the group of lake-forming metals which are known to have use in the formation of mordant colors, including aluminum, zinc, nickel, tin, copper, calcium, barium, antimony, chromium and iron. Aluminum, zinc, and nickel, in that order, have the advantage of contributing the least in the way of objectionable properties to the polymer fiber and are preferred for that reason.

The preferred quantity of the metal compound is such as to provide between 0.02 and 0.2% by weight of metal, based on the polymer. The presence of larger quantities of metal may produce undesirable effects in the fiber. It is particularly for metal contents within that stated range that the process of this invention is of advantage, since it results in better utilization of the metal in the dyeing step. However, the process may also be employed when metals are to be incorporated in larger concentrations, e.g., up to several percent of metal, based on polymer.

The active metals are introduced in the form of salts of carboxylic acids of at least 8 carbon atoms per molecule, the salts being compatible with the polymer. Salts of alkanoic acids are preferred. A preferred group are salts of straight chain, primary carboxylic acids of 12 or more, e.g., up to 30, carbon atoms per molecule; salts of straight chain, primary saturated aliphatic acids of 12 to 20 carbon atoms per molecule are especially suitable. Such aliphatic acids and their salts are well known and it would be superfluous to enumerate them here. The process of this invention may, however, also be applied where it is desired to introduce compatible salts of acids of lower carbon number, e.g., 8 or more carbon atoms per molecule. This group includes salts of secondary and tertiary carboxylic acids of from 8 to 15 carbon atoms per molecule. A suitable group are salts of acids formed by the addition of CO and water to an olefin in the presence of an acidic catalyst, as described, for example, in U.S. 3,059,004 to Waale et al.

Mixtures of salts in which there is a single cation species and several anion species may be used in this invention, as may mixtures in which there is a single anion species and several cation species, and those in which there are more than one species of both cations and anions.

*Dyeability improvers.*—It has been found that certain organic compounds which do not per se impart dyeability to polyolefins have the desired property of improving dyeability of the resulting composition. These dyeability improvers are compounds which (1) have the ability to form a solution or colloidal suspension of the metal salt to be employed; (2) are mutually soluble with the polymer at temperatures above the polymer metling point; and (3) remain homogeneously distributed in the polymer after it is cooled. Good results have been obtained according to this invention by using certain waxes, poly(alkylene oxides) and hydrocarbon oils. Other compounds having the described solubility characteristics may also be useful. It is probable that the improved results are due to an improvement in the dispersion of the metal compound in the polymer, but the effectiveness of this invention is not tied to any theory of how the improvement is caused.

The organic dyeability improver is suitably employed in an amount which is approximately equal to the weight of the metal organic compound being added. Generally, amounts in the range form 0.2 to 2 parts by weight per part of metal organic compound are suitable. Larger amounts may be employed if desired, up to the point at which they adversely affect the properties of the polymer composition. Mixtures of two or more dyeability improvers of the same or of different chemical types can be used.

*Waxes and oils.*—Broadly, hydrocarbon oils and waxes suitable for use in this invention are saturated bicyclic naphthenic hydrocarbons having at least 10 carbon atoms per molecule, and other saturated non-aromatic hydrocarbons having at least 16 carbon atoms per molecule.

The waxes employed as dyeability improvers are preferably natural paraffin waxes; they may be distillate or residual waxes. Particularly preferred are paraffinic distillate waxes having an average carbon number of about 24 and a melting point of about 125° F. Paraffin waxes having melting points up to about 200° F. may be suitably employed.

Useful results are also obtained with paraffins of lower molecular weight, down to and including highly paraffinic liquids of 16 or more carbon atoms. Useful results are obtained, for example, with a white oil, i.e., a highly refined paraffinic petroleum distillate having a pour point between 0° and 20° F. and a viscosity of about 350 SSU at 100° F.

Non-paraffinic waxes, such as microcrystalline waxes, are less suitable than paraffin waxes, i.e., because they tend to contribute undesired color to the final composition.

Some useful results have been obtained with naphthenic hydrocarbon oils and with Decalin. Some improvement of dyeability of polymer compositions has also been obtained when a typical light petroleum distillate machine oil having a viscosity about 300 SSU at 100° F. was employed as dyeability improver.

*Diethers of poly(alkylene oxides).*—A preferred group of dyeability improvers are diethers, preferably dialkoxides, of mixtures of such heteric oxyethyleneoxy-1,2-propylene diols as are described in U.S. 2,425,845 to Toussaint et al.

Said diols are broadly defined as mixtures of heteric oxyethylene-oxy-1,2-propylene diols in which ethylene oxide and 1,2-propylene oxide are combined as oxyethylene and oxy-1,2-propylene groups in a ratio which is at least one-third part by weight of 1,2-propylene oxide for each part of ethylene oxide; the mixtures contain in a single diol molecule both the oxyethylene and the oxy-1,2-propylene groups, and have average molecular weights of at least 300 attributable to said groups.

Said diethers of said diols suitably contain two identical butoxy groups, but may also contain other alkoxy groups, e.g., of 1 to 14 or more carbon atoms. The diethers should have a viscosity of at least about 50 SSU at 100° F., and preferably about 180 to 220.

Particularly good results have been obtained with materials referred to in the pamphlet "UCON Fluids and Lubricants," copyright 1947 by Union Carbide and Carbon Corporation, page 36, as "UCON" lubricants of the D series, having a viscosity of about 200 Saybolt seconds Universal (S.S.U.) at 100° F. These fluids are understood to consist essentially of the di-n-butyl ethers of heteric polymers of oxyethylene and oxy-1,2-propylene.

While the diethers of heteric poly(alkylene oxides) are particularly suitable, ethers of homopolymers of alkylene oxide having properties in the described range may also be employed in the invention.

METHODS OF INCORPORATING ADDITIVES

The only essential requirement for the method of incorporating a metal compound and an improver compound into polyolefin resin is that the combined ingredients must be intimately mixed at a temperature at which the polyolefin is in melted condition, prior to the step at which the resin is extruded to produce a textile fiber or other shape. All of the following methods for preparing such blends result in compositions of improved dyeability according to this invention. The selection of a particular method is generally influenced by commercial considerations, such as the availability of suitable equipment.

*Mixing methods.*—The conversion of blends of polymer resin, metal compound and improver into composites of uniform composition can be carried out by any convenient method for producing blends of thermoplastic resins in which the thermoplastic resin, above its melting point, is intimately mixed with the added materials. Various such methods are known. See, for example, "Processing of Thermoplastic Materials," by Bernhardt, Reinhold Publishing Corp., New York, 1959, particularly under the heading of Mixing and Dispersing in chapter 3 and Mixing and Dispersing Processes in chapter 7. Suitable mixing machines are two roll mixing mills, internal mixers such as Banbury mixers, single screw extruders having appropriately designed mixing sections, and other screw mixers such as double screw and triple screw extruders, pug mills, and the "Ko-Kneader."

Suitable temperatures of the plastic mass during mixing are 400° F. and higher for polypropylene, and preferably between about 500° and 600° F. Other thermoplastic materials are mixed at temperatures at which corresponding viscosities are obtained.

In the following description of the invention, mixing is generally carried out in a mixing extruder. It will be understood that other mixing methods may be substituted without departing from this invention.

*Direct preparations of total blends.*—Polymer resin, such as polypropylene, may be available in the form of finely divided powder or in the form of particles, commonly referred to as nibs or pellets, such as result from extrusion of the polymer in the form of strands and chopping of the strands. Compositions according to this invention can be prepared from resin either in powdered or in particulate form.

In one method of preparation, the desired amount of polymer resin either in powdered or particulate form is combined by dry mixing with the desired amounts of metal compound and improver. The total mixture is made as uniform as possible by mechanical blending action, such as stirring or tumbling, and is then passed through a mixing extruder. It is suitably extruded in the form of strands which are chopped into nibs for later use in melt spinning.

Extruders employed in melt spinning itself are not ordinarily designed to provide a substantial amount of mixing action, but if desired a fiber die may be placed at the end of a mixing extruder.

In alternative methods of preparing a blend of the desired final proportions, polymer resin in powdered or particulate form is mixed by dry mixing with only one of the two additives, i.e., either with the metal compound or the dyeability improver, and the mixture extruded from a mixing extruder. The resulting nibs are then dry-mixed with the second additive and re-extruded through the mixing extruder to provide nibs of homogeneous composition containing both additives.

The so-called "master batch" technique of producing blends is one in which a concentrate of desired additives is prepared and in a second step mixed in suitable proportion with additional clean polymer to produce a final blend of a desired composition. The master batch technique is generally the most practical and preferred technique for producing compositions according to this invention.

A master batch can be prepared starting with either polymer powder or with polymer particles such as nibs. The concentration of the combined metal compound and improver in the master batch concentrate is suitably about 10% by weight of each of of each of the two added ingredients, but may be as high as about 20% by weight of each of the two added ingredients. The master batch itself can be prepared in the same fashion as described above for the preparation of blends of the desired final composition.

In a modification of the master batch technique, a master batch is prepared in which only one of the added ingredients is present. This concentrate, in extruded particulate form, is then combined with the required amount of clean polymer resin and the required amount of the second additive, mixed and re-extruded to provide the desired final composition suitable for melt spinning to produce dyeable fibers.

In another modification, suitable both in the direct production of final composite and in the production of master batch concentrate, the two additives are first combined and intimately mixed and this mixture of the additives is then mixed wtih polymer resin. In the case where the dyeability improver is a waxy solid material, the combination of improver and metal compound is made by melting the two components to form a homogeneous composition, solidifying the melt and comminuting it, such as by crushing or grinding. In the case where the improver is a viscous liquid, the blend of improver and metal compound is a pasty composition which is then mixed with polymer nibs or with polymer powder.

Other methods of preparing the compositions of this invention may occur to the person of skill in this art and may be employed without departing from the invention.

Conversion of uniform compositions prepared according to this invention into the form of monofilament and multifilament fibers, woven or non-woven textiles, or other forms suitable for dyeing, can be carried out by conventional, known procedures. Melt spinning is the conventional way of producing polypropylene fibers. The filaments may be extruded into a liquid bath or air bath, followed by stretching and other known procedures, e.g., crimping, cutting into staple, carding and spinning into yarns.

DYEING

Dyeing of compositions prepared as described is carried out by bringing the dyeable material into reactive contact, usually into surface contact, with an aqueous suspension or emulsion of a finely divided, water-insoluble dyestuff capable of combining with metal. The dyestuff suitably is one which contains a chromophore group and has a carbonyl group in ortho position to a hydroxyl group. The dyestuffs employed are susceptible of combining with lake-forming metals. Broadly, they have either a hydroxyl or carboxyl group in proper position to have the hydrogen atom of the OH replaced by the metal. In some cases the dyeing reaction is comparable with the building of so-called metal chelates and, for example, may parallel the formation of chrome colors. In other cases dye formation is similar to lake formation. In many cases the dyeing reaction appears to be of coordinate covalence and non-ionic type, producing stable coordination compounds.

The application of the dyestuffs from aqueous dispersions or emulsions can proceed according to known dyeing techniques. Those dyestuffs which, besides being pigments insoluble in water, have a melting point higher than 100° C., and preferably above 115° C., are preferred. The dyeing is normally done at the boiling point at atmospheric pressure, but may be at higher temperature under superatmospheric pressure.

The following are illustrative of particularly suitable dyes:

Anthraquinone dyes such as 1,2,4-trihydroxy anthraquinone, 1,2,3-trihydroxy anthraquinone, 1,4-dihydroxy anthraquinone and alizarine blue.

Dyes of other suitable classes include 2,3,4-trihydroxybenzophenone, and C.I. (color index) Pigment Red 23.

C.I., second edition, pages 3575–3591, lists natural colors which have the useful structure.

Particularly suitable dyes are those which contain a salicylic acid radical, for instance, diazo dyes having the formulas

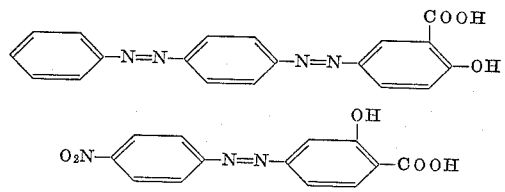

and C.I. 43830, a triphenylmethane type dye having a salicylic acid radical. Substituted salicylic acid radicals, such as the resorcylic acid radical, are also suitable.

Among the satisfactory dyestuffs for textiles prepared according to this invention are diazo dyestuffs having the above-referred-to arrangement of a chromophore group and a carbonyl group in ortho position to a hydroxyl group. Anthraquinone dyestuffs having this structure are also satisfactory, as are triphenylmethane dyestuffs having this arrangement.

ILLUSTRATIVE EXAMPLES

The invention will be further described by reference to the following examples. The examples are illustrative of the several aspects of this invention, including the preferred mode of practicing the same, but are not to be considered as limiting the invention.

Unless otherwise stated, parts and percentages are by weight.

Unless otherwise stated, the polymers employed for preparing the illustrative compositions are highly crystalline polypropylenes produced by contacting propylene with a catalyst consisting of the reaction product of diethyl aluminum chloride and gamma titanium trichloride, and having the following characteristic properties:

| | |
|---|---|
| Crystallinity, percent | Approximately 65 |
| Intrinsic viscosity, dl/g. | 2–2.5 |
| Catalyst residue, wt. (as ash) | <0.1 |

*Fiber preparation method.*—Polypropylene powder is extruded to form nibs at an extrusion temperature of 400° F. Separately a mixture of equal parts by weight of metal salt and dyeability improver is prepared by melting and agitating the two components, cooling the melt and crushing it to form small particles.

The polypropylene nibs and crushed melt are mixed to provide a composition of 92 parts polypropylene, 8 parts metal salt and 8 parts wax. This composition is mixed by tumbling and then combined with additional polypropylene nibs to provide an over-all composition containing 98.2 parts polypropylene, 1.8 parts metal salt and 1.8 parts wax. The final composite is re-extruded at 600° F. and converted to nibs.

The nibs of the resulting composite are extruded in a conventional melt-extrusion operation to produce a polypropylene filament which is then drawn at a stretch ratio in the range from 3:1 to 8:1, giving 1–15 denier fiber having the following characteristics:

| | |
|---|---|
| Tenacity, g./den. | 4–8 |
| Elongation, percent | 20–35 |

The resulting fibers are then dyed as such or cut into staple, carded and spun to produce yarn approximating 10's single (cotton system) count. Convenient sized skeins are reeled from this yarn stock and used to accomplish the dyeings which illustrate in part the present invention.

*Dyeing method.*—In the dyeing procedure a ten-gram skein of yarn is immersed in a 500 ml. dye vat. The bath is prepared by adding to distilled water at room temperature sufficient acetic or formic acid to adjust the pH to 5.5 to 6 and thereafter adding the dyestuff. The skein of yarn to be dyed is separately wet out in a ½% solution of a non-ionic detergent (Triton X-100=isooctylphenol polyethoxy ethanol) at 140° F. and rinsed thoroughly in running water to remove remaining detergent. The wet fiber skein is placed in the aqueous dye vat and the temperature thereof raised to boiling over a period of one-half hour while agitation of the fiber is maintained to achieve uniformity of dyeing. Temperature and agitation are maintained at 212° F. for a period of at least 45 more minutes. The dyed skein is removed from the bath and thoroughly rinsed in running water at 160° F. The dyed skein is then scoured to remove any unfixed color by turning it in a 400 ml. 180° F. aqueous bath, containing ½% of Triton X-100 and 1% sodium carbonate, for a period of fifteen minutes. A thorough rinse in 120° F. running water completes the dyeing process. The skein is then air-dryed or dryed in an oven at 200° F.

In order to make the comparison between fiber produced according to this invention and fiber of a control experiment, separate skeins of each are dyed with a number of different dyes. For each of the dyes a comparison is then made of the results obtained with fiber prepared according to this invention and with fiber prepared without dyeability improver. The results are then averaged. Observations of the depth and uniformity of dyeing are made visually by persons experienced in the dyeing of textile fibers.

In a typical evaluation of dyeability improvement according to this invention the following dyes are employed: (1) Tri-hydroxybenzophenone in 1% concentration based on the fiber. The skines are dyed a medium shade of beige. (2) Nitro-alizarine (1,2-dihydroxy-3-nitro-anthraquinone) in 1% concentration by weight based on the fiber. The skeins are dyed a bright reddish-orange. (3) Heterocyclic anthraquinone dyestuff, 5,6-dihydroxy-7,8-phthalyl quinoline in 3% concentration based on the fiber. The skeins are dyed a deep, clear blue-violet. (4) 1,2,4-Trihydroxy anthraquinone in 0.8% concentration based on the fiber. The skeins are dyed a bright crimson red.

The colors stated as being obtained with the dyes are in all cases for a fiber in which the metal added is aluminum, added as stearate.

*Example 1*

The above procedure is carried out utilizing as metal salt aluminum monostearate and as dyeability improver distillate paraffin wax having a melting point of about 125° F. The control example is carried out with the same amount of the same metal salt but without addition of dyeability improver.

The samples prepared according to the invention are found to have a significantly deeper color with each of the above-identified dyes than have the control samples.

*Example 2*

A sample is prepared in which zinc stearate is substituted for aluminum stearate in Example 1. The sample is dyed with 1,2,4-trihydroxy anthraquinone. The resulting color is a deep bluish red. A substantially deeper color is observed in the sample prepared according to this invention with paraffin wax than in the control sample in which no dyeability improver is employed.

*Example 3*

Example 1 is repeated substituting nickel palmitate for aluminum stearate. The sample is dyed with 1,2,4-trihydroxy anthraquinone. The color of the dyed skein is found to be dull purple. A substantially deeper color is observed in the skein prepared according to this invention with paraffin wax than in the control sample prepared without paraffin wax.

*Examples 4–16*

A series of blends are prepared by the methods described below and identified in Table 1. The various blends are melt extruded to form nine denier multifilaments which are then tested for dyeability as described above. The dyed samples are rated for dye affinity by visual observation on an arbitrary numerical scale of 1 to 4, the highest rank (1) being given to the sample showing on the average the greatest color depth.

*Addition Method I.*—A mixture of powdered polypropylene and aluminum stearate is blended. Liquid dyeability improving additive is added with additional blending.[1] The resulting mixture is combined with additional powdered polypropylene extruded through a mixing extruder at 450° F. and the resulting nibs re-extruded at 600° F.

*Addition Method II.*—A mixture of polypropylene nibs, metal salt, and dyeability improving additive is charged to a mixing extruder and extruded at 500° F. The resulting nibs are combined with additional clean polypropylene nibs and re-extruded through the mixing extruder at 600° F.

*Addition Method III.*—Powdered polypropylene is mixed with a metal organic salt and the dyeability improving additive, the mixture passed through a mixing extruder at 400° F., and the resulting nibs combined with additional clean polypropylene nibs and re-extruded at 600° F.

*Addition Method IV.*—Polypropylene powder is mixed with metal organic salt and dyeability improving additive by dry blending and the mixture is combined with additional clean polypropylene powder, charged to a mixing extruder, and extruded at 400° F.; the resulting nibs are re-extruded at 600° F.

---
[1] In the case of paraffin wax, the wax is melted and added to the blend of polymer and metal compound which has been heated to about 55° C.

TABLE 1

| Example No. | Blending Method | Metal Salt Composition | Metal Salt Concentration, Percent Weight [1] | Dyeability Improver Composition | Dyeability Improver Concentration, Percent weight [1] | Dye Affinity Rank |
|---|---|---|---|---|---|---|
| 4 | I | Al stearate | 1.8 | Mixture of paraffin wax M.P. 125° F. and dibutyl ether of heteric polyalkylene oxide. | 0.9 0.9 | 1 |
| 5 | II | ----do---- | 1.8 | Paraffin wax M.P. 125° F | 1.8 | 1 |
| 6 | I | ----do---- | 1.8 | Paraffin wax M.P. 125° F | 1.8 | 2 |
| 7 | III | ----do---- | 1.8 | Dibutyl ether of heteric polyalkylene oxide | 1.8 | 2 |
| 8 | I | ----do---- | 1.8 | Paraffin wax M.P. 125° F | 0.9 | 3 |
| 9 | IV | ----do---- | 1.8 | n-Cetane | 1.8 | 3 |
| 10 | IV | ----do---- | 1.8 | Dibutyl ether of heteric polyalkylene oxide | 0.9 | 4 |
| 11 | I | ----do---- | 1.8 | Paraffin wax M.P. 142° F | 1.8 | 3–4 |
| 12 | I | ----do---- | 1.8 | Paraffin residual wax M.P. 183° F | 1.8 | 3–4 |
| 13 | I | ----do---- | 1.8 | Distillate white oil | 1.8 | 3–4 |
| 14 | I | ----do---- | 1.8 | None | | 5 |
| 15 | II | ----do---- | 1.8 | ----do---- | | 5 |
| 16 | III | ----do---- | 1.8 | ----do---- | | 5 |

[1] Basis final composition.

Similar relative dye affinity ratings are obtained when Examples 4–16 are repeated with substitution, for aluminum stearate, of aluminum laurate, aluminum palmitate, and the aluminum salt of branched acids of 9–13 carbon atoms per molecule resulting from the addition of CO and water to $C_8$–$C_{12}$ alpha-olefins as described in U.S. 3,059,004 to Waale et al.

We claim as our invention:

1. A dyed polyolefin stable to washing, dry cleaning and fading, which is uniformly impregnated with (a) from 0.2% to 4.0% of an organic dyeability improving compound which does not per se impart dyeability to the polyolefin but which has the ability to form a solution or colloidal suspension of the metal salt, which is mutually soluble with a polyolefin at temperatures above the polyolefin melting point, and which remains homogeneously distributed in the polyolefin after it is cooled, said dyeability improving compound being selected from the group consisting of naphthenic hydrocarbons containing at least two naphthene rings, paraffinic hydrocarbons of at least 16 carbon atoms per molecule, and diethers of poly(alkylene oxides); and (b) the colored reaction product of a metal of valence at least 2, originally present in said polyolefin in the form of from 0.5% to 5% of a polyolefin-compatible metal salt of a monocarboxylic acid having at least 8 carbon atoms per molecule, with a water insoluble dyestuff which contains a chromophore group and a carbonyl group in ortho position to a hydroxy group.

2. A composition according to claim 1 in which said polyolefin is polypropylene, said added metal salt is a salt of an alkanoic acid having at least 8 carbon atoms per molecule, and the metal of said metal salt is present in an amount between 0.02 and 0.2% by weight of the polypropylene.

3. A composition according to claim 2 in which said dyeability improving compound is a paraffin having at least 16 carbon atoms per molecule.

4. A method for producing dyeable polypropylene of improved dye affinity which comprises mixing polypropylene with from 0.5% to 5.0% of a polyolefin-compatible salt of a metal of valence at least 2 and a monocarboxylic acid having at least 8 carbon atoms per molecule and from 0.2% to 4.0% of an organic dyeability improving compound which does not per se impart dyeability to the polyolefin but which has the ability to form a solution or colloidal suspension of the metal salt, which is mutually soluble with a polyolefin at temperatures above the polyolefin melting point, and which remains homogeneously distributed in the polyolefin after it is cooled, said dyeability improving compound being selected from the group consisting of naphthenic hydrocarbons containing at least two naphthene rings, paraffinic hydrocarbons of at least 16 carbon atoms per molecule, and diethers of poly(alkylene oxides), and blending the mixture above the melting point of said polypropylene to produce a substantially homogeneous composition.

5. The method according to claim 4 wherein said dyeability improving compound is a naphthenic hydrocarbon containing at least two naphthene rings.

6. A method according to claim 4 wherein said dyeability improving compound is a paraffin wax having at least 16 carbon atoms per molecule.

7. A method according to claim 4 wherein said dyeability improving compound is a paraffin wax.

8. A dyed polyolefin stable to washing, dry cleaning and fading which is uniformly impregnated with (a) from 0.2% to 4% of a dyeability-improving dialkoxide of a heteric oxyethylene-oxy-1,2-propylene diol and (b) the colored reaction product of a metal of valence at least 2, originally present in said polyolefin in the form of from 0.5% to 5% of a polyolefin-compatible metal salt of a monocarboxylic acid having at least 8 carbon atoms per molecule, with a water insoluble dyestuff which contains a chromophore group and a carbonyl group in ortho position to a hydroxy group.

9. A composition according to claim 8 in which said dialkoxide is a dibutoxide.

10. A method for producing dyeable polypropylene of improved dye affinity which comprises mixing polypropylene with from 0.5% to 5.0% of a polyolefin-compatible salt of a metal of valence at least 2 and a monocarboxylic acid having at least 8 carbon atoms per molecule and from 0.2% to 4.0% of a dyeability-improving dialkoxide of a heteric oxyethylene-oxy-1,2-propylene diol, and blending the mixture above the melting point of said polyproylene to produce a substantially homogeneous composition.

11. The method of claim 10 wherein said dialkoxide is a dibutoxide.

12. A method for producing dyeable polypropylene of improved dye affinity which comprises mixing polypropylene with from 0.5% to 5.0% of a polyolefin-compatible salt of a metal of valence at least 2 and a monocarboxylic acid having at least 8 carbon atoms per molecule and from 0.2% to 4.0% of a deyability-improving mixture of a substantial proportion of a paraffin wax and a substantial proportion of a dialkoxide of a heteric oxyethylene-oxy-1,2-propylene diol, and blending the mixture above the melting point of said polypropylene to produce a substantially homogeneous composition.

13. The method according to claim 12 in which said dyeability-improving mixture is a mixture of equal parts of a paraffin wax and a dibutoxide of a heteric oxyethylene-oxy-1,2-propylene diol.

(References on following page)

References Cited

UNITED STATES PATENTS

| | | | |
|---|---|---|---|
| 2,268,501 | 12/1941 | Bradley | 260—759 |
| 2,448,799 | 9/1948 | Happoldt et al. | 260—28.5 |
| 2,512,459 | 6/1950 | Hamilton | 260—28.5 |
| 2,984,634 | 5/1961 | Caldwell et al. | 260—23 |
| 3,098,697 | 7/1963 | Cappuccio et al. | 260—897 |
| 3,163,492 | 12/1964 | Thomas | 260—23 |
| 3,164,438 | 1/1965 | Thomas | 260—23 |
| 3,192,007 | 6/1965 | Turbak | 8—55 |
| 3,201,364 | 8/1965 | Salyer | 260—33.6 |

FOREIGN PATENTS 814,582  6/1959  Great Britain.

OTHER REFERENCES

Noller: "Chemistry of Organic Compound," 1957, p. 82.

Wilson: "British Compounding Ingredients for Rubber," 1958, pp. 255 and 256.

DONALD E. CZAJA, *Primary Examiner.*

LEON J. BERCOVITZ, *Examiner.*

R. A. WHITE, *Assistant Examiner.*